INVENTORS
Charles G. Boss
Herbert B. Johnson
BY
their Attorney

United States Patent Office 2,813,626
Patented Nov. 19, 1957

2,813,626
METHOD FOR SEPARATING ASBESTOS FROM ITS ORES

Herbert B. Johnson and Charles G. Boss, Rochester, N. Y., assignors to The Quaker Oats Company, Chicago, Ill., a corporation of New Jersey Application November 24, 1953, Serial No. 394,069

2 Claims. (Cl. 209—2)

This invention relates to methods and apparatus for separating materials from their ores, and, more particularly, for separating asbestos fibers from the ores in which they are intermixed and embodied. It has been a common practice to produce asbestos from its ores by a process generally known as successive step reduction and air lifting. This process comprises the progressive crushing of the ore in several steps, and the passing of the crushed ore over vibrating or shaking screens between successive crushing steps. At the delivery end of these screens, the crushed ore is subject to a strong current of air which removes the exposed asbestos fibers and carries them to a collector. Each successive crushing step exposes fresh asbestos fiber which is removed and prepared for commercial uses.

This process proved generally satisfactory in the past, when the main emphasis was placed on the recovery of the longer asbestos fibers, and the shorter fibers were discarded as of little commercial value. However, due to recent economic and technical developments, the shorter fibers have acquired considerable commercial value, and increasingly greater quantities are being used in asbestos-cement products, moulded brake linings, as a filler in many kinds of plastic products, and for many other purposes.

It is, therefore, an object of this invention to provide a more efficient method of recovering asbestos fiber from its ores, and particularly a method that removes the medium and the shorter fibers heretofore lost.

Another object is to provide a method for efficient recovery of the short asbestos fibers contained in the tailings or waste matter heretofore discarded in the conventional asbestos milling operations.

In its natural state, asbestos is found intermixed with other minerals in its ores, the asbestos fibers being folded, compressed, and intertwined with each other and with the other constituents of the ores. In the recovery and concentration process it is desirable not only to remove the fibers from the other minerals, but to accomplish a "fiberizing" treatment, that is to unfold and separate the fibers from each other. The conventional milling, beating and air screening process does this in an inefficient manner, by crushing the entire mass and pneumatically separating the released fibers. This results in considerable breaking of the fibers, and the consequent shortening of the average length thereof. In addition, the fibers have not been completely unfolded or exfoliated, and this resulted in a shorter effective length of the recovered fibers. It is, therefore, another object of this invention to draw out and unfold the fibers for more efficient separation of the asbestos from the associated waste matter in the ore with a minimum of damage to the individual fibers, and to increase the effective length of the separated fibers.

A further object is to provide an efficient apparatus for carrying out the above method and one that may be conveniently used in conjunction with existing asbestos mills to increase the efficiency of operation thereof, and to recover and utilize the short fiber content of the waste matter of tailings therefrom.

A still further object is to provide an apparatus of the above description that may be readily manufactured and installed at relatively low cost and that is efficient, reliable, and inexpensive to operate.

To these and other ends, the invention resides in certain improvements and combination of parts and method steps, all as will be hereinafter more fully described, the novel features being pointed out in the claims at the end of the specification.

Figure 1:
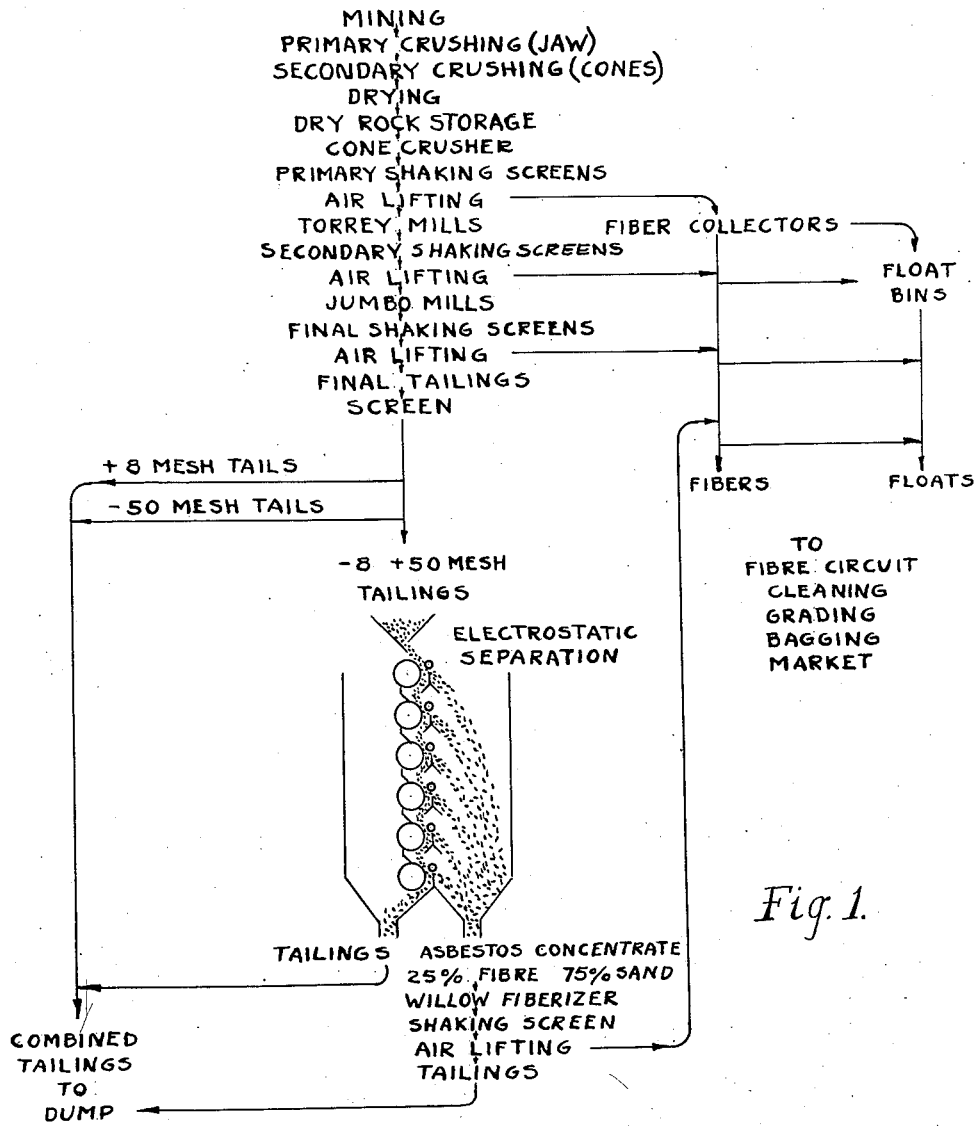
Fig. 1 is a flow sheet of an asbestos milling process wherein the tailings from a conventional mill are subjected to electrostatic separation and other beneficiating steps embodying this invention, the separator being shown schematically.

Referring to the drawings, Fig. 1 is a flow sheet showing the combination with a known asbestos recovery process, of electrostatic separation and associated steps in accordance with this invention. The treatment steps of known asbestos mills commonly comprise the crushing of the ore in several steps, by means of jaw or gyratory crushers, and the recovery of the exposed asbestos fibers by passing the crushed ore over a shaking or vibrating screen through which a blast of air is passed, carrying away the loose fibers to a collector of suitable type, such as a cyclone separator. Frequently, the ore is dried after crushing and before the first air screening step. The successive crushing, screening and air lifting steps are repeated until the maximum amount of asbestos fibers have been removed. This is commonly the end of the present asbestos recovery process, and mill tailings are discarded to dump.

Heretofore, about 20 to 25% of the asbestos content of the original ore has remained in minus 8 plus 50 mesh portion of these tailings and been lost when the tailings are discarded. We have found that the problems presented by this considerable loss of valuable fiber material may be solved by a new combination of treatment steps comprising the electrostatic and associated steps hereafter described, with the saving of a large percentage of fiber which would otherwise be lost.

Figure 2:
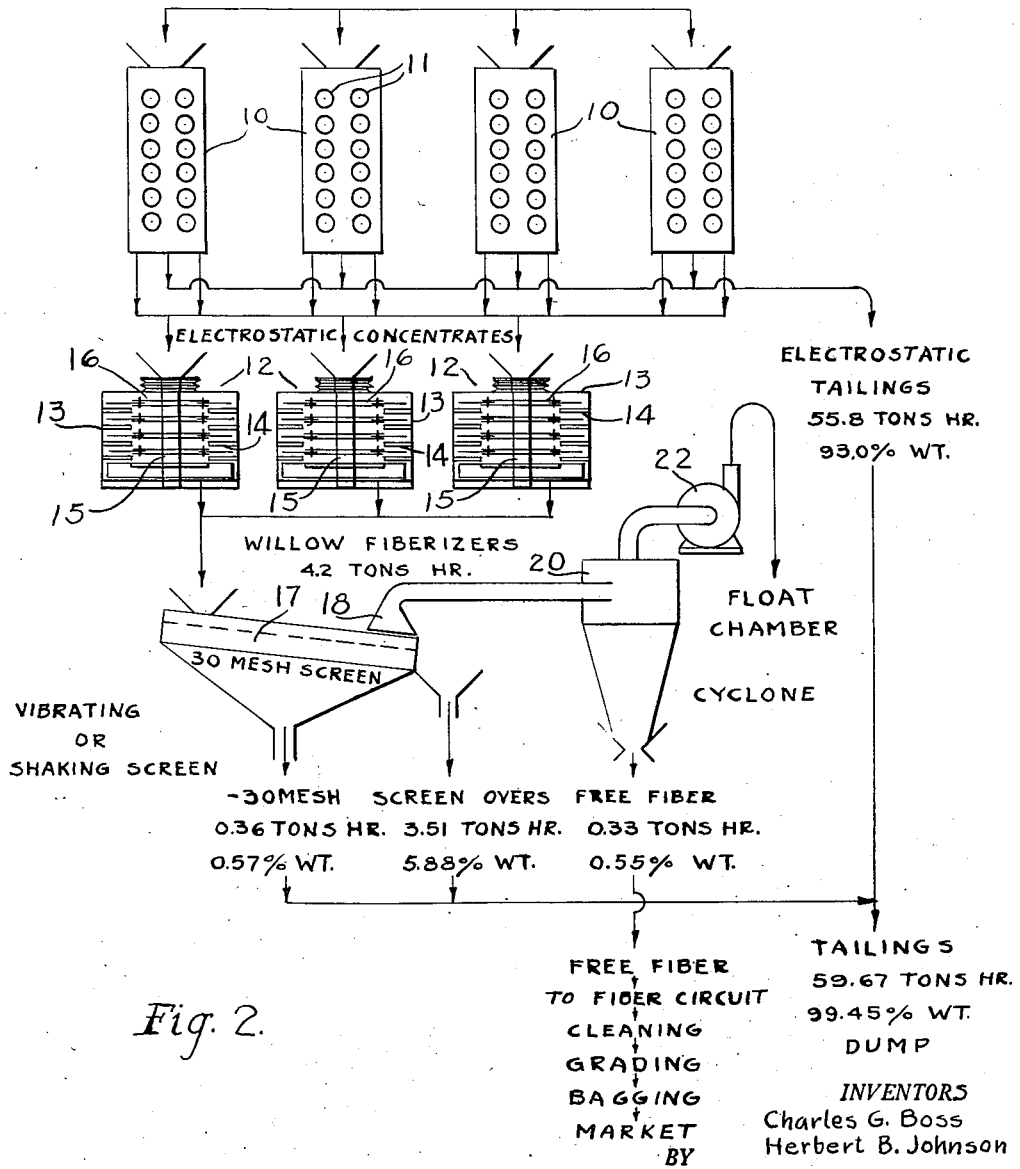
Fig. 2 is a more detailed flow sheet showing schematically the electrostatic separating and subsequent separating and refining steps and devices forming part of our invention.

Our new combination of steps is shown diagrammatically in more detail in Fig. 2. Referring to this figure, in a typical installation for treating 60 tons of 8 to 50 mesh tailings per hour, we employ four electrostatic separators 10, arranged in parallel, each consisting of 6 double units 11, arranged in vertical series, the operation of which will be hereafter more fully described. It has been found that this arrangement will remove substantially all the asbestos of commercial importance from the tailings, although the recovered asbestos still contains other minerals adhering to and entrained in the fibers. We therefore pass the recovered asbestos through beaters or fiberizers, 12, which are themselves well known in the art, one example of which is the commercially available "Willow Fiberizer," which comprises a shell or casing 13 rigidly supporting a plurality of rows of inwardly projecting arms 14. A rotating central vertical shaft 15 carries a series of sets of beating arms 16, arranged to pass between the rows of arms 14, and to subject material passing therebetween to violent beating and shearing forces.

These beaters subject the asbestos and the associated waste materials to a severe hammering or beating, thereby fluffing or "fiberizing" the fibers and loosening the waste minerals clinging thereto. We then pass the beaten fiber and its associated waste materials over an inclined shaking or vibrating screen 17 of known construction and preferably of about 30 mesh screen opening. The loose fine material, such as ore particles, sand, dust, and the like fall through screen 17 and are discarded. The fibers and the larger fragments of waste material remain on the screen and pass under suction hood 18, which is disposed a short distance above the lower, or discharge end of the screen. A strong current of air is drawn up through screen 17 and into hood 18, through cyclone separator 20 by a suitable fan or blower 22 and this current of air picks up the asbestos fibers and carries them to separator 20, where they are removed from the air stream and recovered, and sent to the grading, bagging and shipping departments. Very fine dust that passes through separator 20, passes to a float chamber, or other suitable collector, and is discarded or sold as floats.

Figure 3:
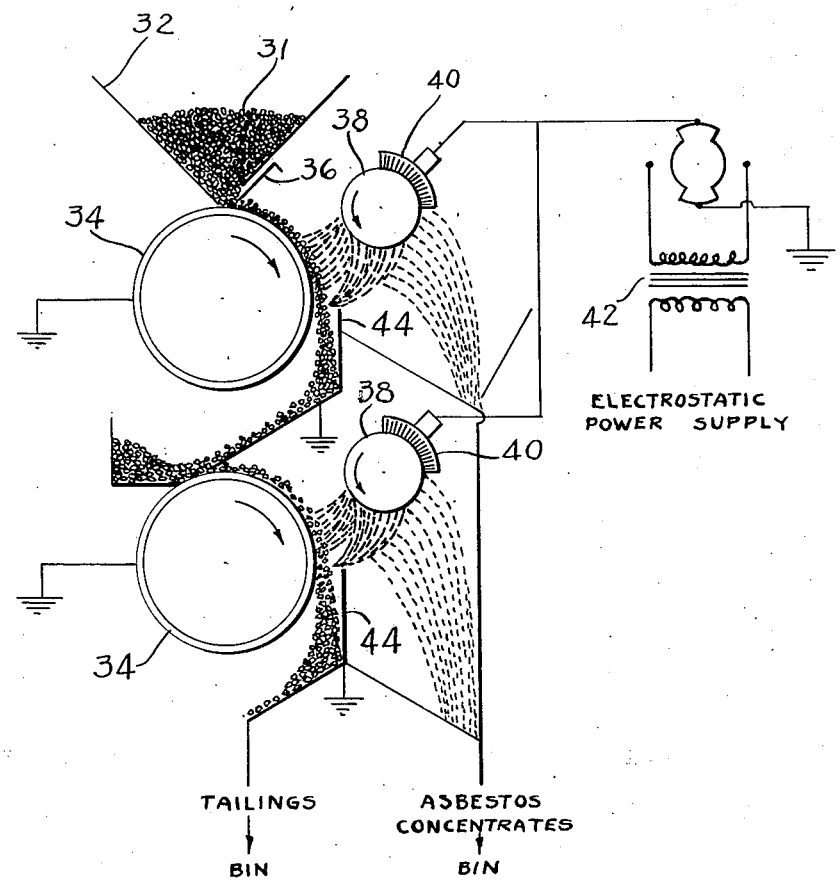
Fig. 3 is a more detailed schematic diagram of the electrostatic separation equipment of Figs. 1 and 2.

Fig. 3 is a more detailed schematic diagram of our electrostatic separator 10, showing a vertical series of two units, whose mode of operation will now be described. The 8 to 50 mesh tailings 31, are fed into a hopper 32, and thence distributed in a thin layer, under control of an adjustable gate 36, to the upper surface of a cylindrical electrode 34, rotatably mounted in suitable frame bearings and driven in a clockwise direction by known motor means (not shown), as well understood in the art. This conveying electrode 34 is preferably provided with an electrical connection to ground potential as indicated.

A second cylindrical electrode 38 is rotatably mounted in insulated bearings, parallel to and slightly spaced from electrode 34, and is rotated by known and suitable means in a direction opposite to that of electrode 34. A conducting brush or wiper 40 such as described in the patent to Herbert B. and Ralph H. Johnson, No. 2,428,224, bears on electrode 38, and is connected to a direct current source of high voltage, supplying between 12,000 to 20,000 volts, shown generally at 42 and more fully described in the above cited patent.

A sharp edged separating blade 44 is mounted at a position intermediate and below electrodes 34 and 38 and below the field therebetween, and electrically grounded, as shown, and is provided with chute surfaces for disposing of the separately collected ore particles and fibers.

As crushed ore particles or tailings 31 are fed to the top of electrode 34 and come under the effects of the field between electrodes 34 and 38, they take on a charge by induction, the better conductors acquiring a charge of opposite polarity to that of electrode 38 and the poorer conductors being affected to a lesser degree if at all. As the particles are discharged from electrode 34 by its rotation, and drop in free-falling flow through the intermediate field, the better conductors are repelled outwardly and the poorer conductors depressed relative to the conveying electrode 34. We have found that the asbestos fibers are better conductors to a marked degree and are mainly repelled toward electrode 38, while the particles of ore are mainly depressed and fall in a substantially vertical direction, as shown. Divider blade 44 is adjusted with its edge intervening between the separating streams of fibers and ore particles, and, with its chute surfaces, effects separate disposal of the two streams. We have found that the longer fibers tend to be drawn at one end into contact with the charged electrode 38 and so pulled over the divider blade 44, as shown. The shorter fibers or fiber strings clear the divider blade, while longer ones tend to be repelled, rather than attracted by the blade and are pulled over it, the fibers, or fiber strings or bundles of all lengths are loosened, exfoliated and pulled out into more straightened and separated condition in which they are more easily separated from impurities.

The fibers adhering to electrode 38 are moved in a counterclockwise direction by the rotation thereof and further rotation of electrode 38 tends to pull and stretch these fibers, thus further unfolding and straightening them, thereby increasing the effective length and quality thereof. Those fibers which continue to adhere to electrode 38 are eventually brushed off by the electrode wiper 40 and dropped to the right of the divider blade.

This process may be repeated any number of times necessary to effect substantially complete recovery of the fiber contained in the ore. We have found that six successive treatments will extract substantially all the commercially usable asbestos from the Quebec ores used in our tests.

Our invention is adapted to be readily combined with existing mine installations and has found immediate use in supplementing existing asbestos recovery plants by treating the tailings thereof, as described above. However, we contemplate the advantageous use thereof in various combinations with known and existing methods and devices used in the industry to treat the asbestos bearing ore at all stages of its progress through the mill, as well as in the treatment of tailings, as above described.

It will thus be seen that the invention accomplishes its objects and while it has been herein disclosed by reference to method steps and apparatus of the particular nature preferred, it is to be understood that such disclosure is intended in an illustrative, rather than a limiting sense, as it is contemplated that various modifications in the order and details of such steps and apparatus parts will readily occur to those skilled in the art, within the spirit of the invention and the scope of the appended claims.

We claim:

1. In a method of recovering asbestos fibers from asbestos ore by successive crushing, screening and air lifting operations, the steps of recovering folded and unopened fibers from the normally discarded tailings at the end of said operations, comprising feeding said tailings in a thinly distributed free-falling stream through a series of electrostatic fields and dividing fiber-containing material from waste material below each field, until substantially all of the fiber-containing material in said tailings is recovered, each of said fields having a high electric potential for repelling fiber-containing material in advance of waste material, then subjecting said recovered material to a beating treatment to open and unfold the fibers and further separate them from entrained waste material, and then removing said fibers by screening and air lifting.

2. In a method of recovering asbestos fibers from asbestos ore by successive crushing, screening and air lifting operations, the steps of recovering folded and unopened fibers from the tailings normally discarded at the end of said operations, comprising screening said tailings to recover the substantially minus 8 plus 50 mesh portion thereof, feeding said tailings portion in a thinly distributed free-falling stream through a series of electrostatic fields of high potential for repelling fiber-containing material in advance of free waste material and successively dividing said fiber-containing material from said free waste material below each field, continuing said series of electrostatic treatments until substantially all of the fiber-containing material in said tailings has been recovered from free waste material, and then subjecting said recovered fiber-containing material to a beating treatment to open and unfold the fibers and further separate them without substantial breakage from entrained waste material, and then removing said fibers by screening and air lifting.

References Cited in the file of this patent

UNITED STATES PATENTS

| Number | Name | Date |
| --- | --- | --- |
| 1,549,875 | Horne | Aug. 18, 1925 |
| 2,197,864 | Johnson | Apr. 23, 1940 |
| 2,280,902 | Ellison | Apr. 28, 1942 |
| 2,357,658 | Johnson et al. | Sept. 5, 1944 |
| 2,428,224 | Johnson et al. | Sept. 30, 1947 |
| 2,559,076 | Johnson | July 3, 1951 |